United States Patent

Aidone et al.

[11] Patent Number: 5,951,128
[45] Date of Patent: Sep. 14, 1999

[54] AUTO LAP-TOP COMPUTER SUPPORTING CONSTRUCTION

[76] Inventors: Sal Aidone, 475 18th St., W. Babylon, N.Y. 11704; Steve Fyne, 41 Lenox St., Lindenhurst, N.Y. 11757

[21] Appl. No.: 08/984,623

[22] Filed: Dec. 3, 1997

[51] Int. Cl.[6] ................................................. A47B 83/00
[52] U.S. Cl. ............................... 312/235.8; 312/223.3; 312/290; 312/313; 312/281; 108/44
[58] Field of Search .................. 312/223.3, 235.8, 312/283, 290, 309, 311, 313, 321, 327, 328, 350, 280, 281, 312; 108/44, 108; 224/275, 277; 211/90.02, 103, 187; 248/243, 248; 206/305, 320; 220/334

[56] References Cited

U.S. PATENT DOCUMENTS

| | | | |
|---|---|---|---|
| 1,973,628 | 9/1934 | Hindle | 312/312 |
| 2,284,811 | 6/1942 | Ferrelle | 312/313 X |
| 3,360,116 | 12/1967 | Somers et al. | 220/334 X |
| 4,288,131 | 9/1981 | Griffin | 312/313 X |
| 5,092,507 | 3/1992 | Szablak et al. | 312/235.8 X |
| 5,242,056 | 9/1993 | Zia et al. | 206/320 X |

*Primary Examiner*—Peter M. Cuomo
*Assistant Examiner*—Karlena D. Schwing
*Attorney, Agent, or Firm*—Myron Amer P.C.

[57] ABSTRACT

For a vehicle front bench seating arrangement in which an arm rest is pivotal between a horizontal in-use position and a vertical non-use position at a location between the driver's and the passenger's seats, and a lap-top computer in a housing is positioned in facing relation to the driver supported upon the in-use armrest position, and the lap-top computer housing has a vertical degree of adjusting movement to account for the different heights of armrests, so that the keyboard of the lap-top computer is horizontally oriented to facilitate the use of the push buttons on the keyboard.

1 Claim, 3 Drawing Sheets

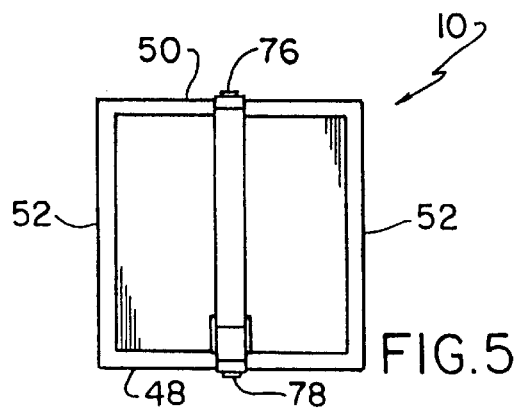
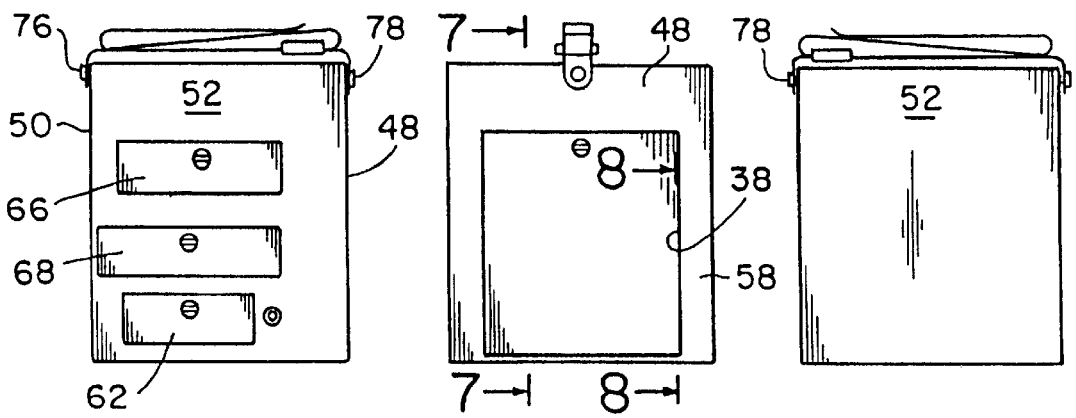
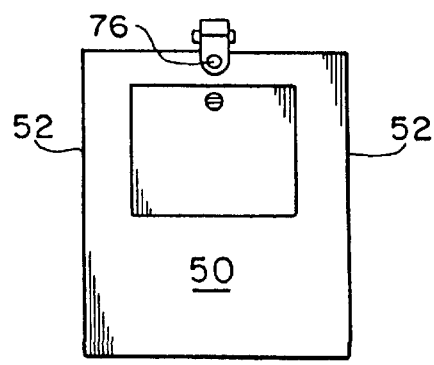

AUTO LAP-TOP COMPUTER SUPPORTING CONSTRUCTION

The present invention relates to improvements to a support positioned on the front passenger's seat in an auto for a lap-top computer to be used by an occupant of the driver's seat, such use being typically made by a salesperson when the auto is parked at the site of a customer and consequently providing an on-the-spot report, the improvements more particularly contributing to simplified construction of the lap-top computer support, rendering it applicable for use in a wide range of autos, and providing other noteworthy benefits.

Example of the Prior Art

A support in an auto for a lap-top computer for use by an occupant of the driver's seat is already disclosed and illustrated in U.S. Pat. No. 4,946,120 for "Support" issued to David 0. Hatcher on Aug. 7, 1990. The '120 lap-top computer support has been singled out for its attempt to use to advantage the auto armrest for support on which the lap-top computer is physically attached. By this physical attachment to the armrest the '120 support qualifies for use in a wide range of autos having a corresponding wide range of shapes and sizes, particularly in height, of armrests, but the tradeoff is that the support must include appropriate structural features for its attachment to the armrest.

Broadly, it is an object to provide an auto lap-top computer support overcoming the foregoing and other shortcomings of the prior art.

More particularly, it is an object to provide a housing or construction on the passenger's seat for a lap-top computer both during non-use and use and converting from one to the other using a degree of opposite direction vertical movement in the operating mode of the construction, wherein this noted degree of movement adjusts for height variation in the armrest to enable its use to provide support from below the lap-top computer and thus obviating any requirement of physical attachment to the armrest, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIGS. 2–6 are respectively reduced scale perspective views of the FIG. 1 construction wherein, more particularly, FIG. 2 is a front elevational view thereof, FIG. 3 is a left side elevational view thereof, FIG. 4 is a right side elevational view thereof, FIG. 5 is a plan view thereof, and FIG. 6 is a rear view thereof;

Figure 1:
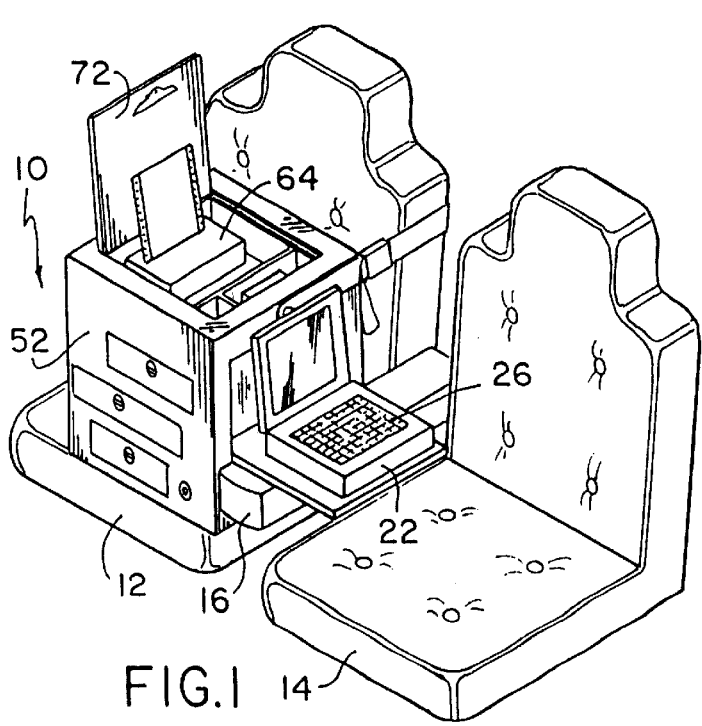
FIG. 1 is a perspective view of a lap-top computer-supporting construction according to the present invention.
Figure 9:
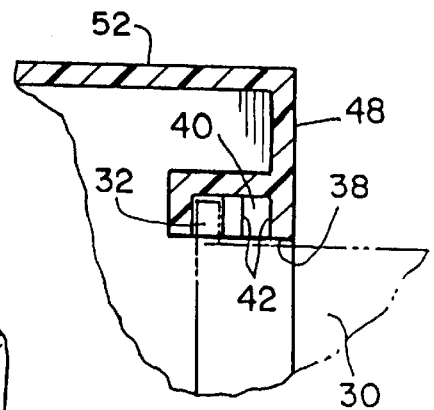
FIG. 9 is similarly an enlarged scale partial sectional view, taken along line 9—9 of FIG. 8 illustrating further details of the track of FIG. 9.

Shown in FIG. 1 is a lap-top computer-supporting structure, generally designated 10, primarily for use in an auto of a type having so-called front bench type seating accommodations consisting of side-by-side passenger 12 and driver 14 seats and having an armrest 16 in an interposed position, as illustrated, between the seats 12, 14, which armrest 16 in various auto models is, as understood by common experience, of different heights 18 and which as a consequence when maintaining, in accordance with the present invention, support from beneath a lap-top computer, as at 20, in facing relation to an occupant of the driver's seat 14 requires adjustment to the particular height 18 of the armrest 16, so that the lap-top computer 22 is in a preferred horizontal orientation, as noted at 24, which facilitates use of the computer keyboard 26.

Figure 8:
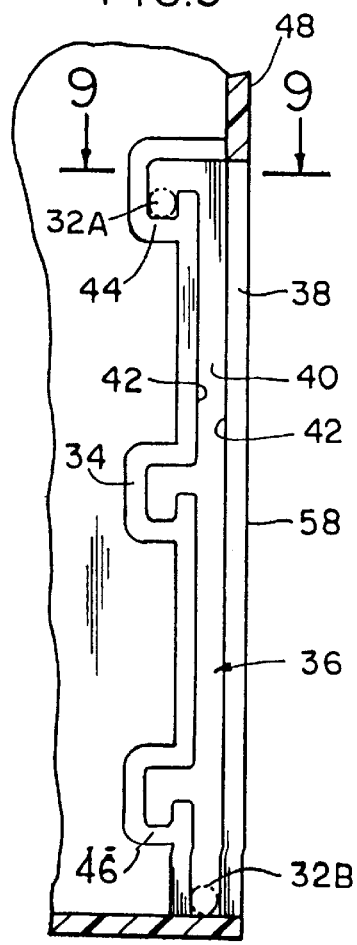
FIG. 8 is a partial sectional view, in an enlarged scale, taken along line 8—8 of FIG. 2 illustrating details of a track for positioning the lap-top computer at a selected horizontal position preparatory to use.
Figure 10:
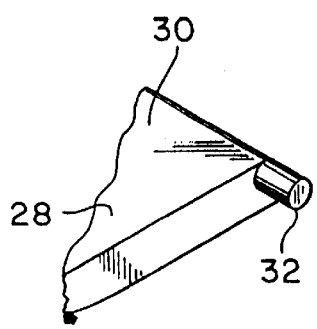
FIG. 10 is a still further enlarged scale partial perspective view illustrating a lug component which tracks in the track of FIGS. 8, 9.
Figure 7A:
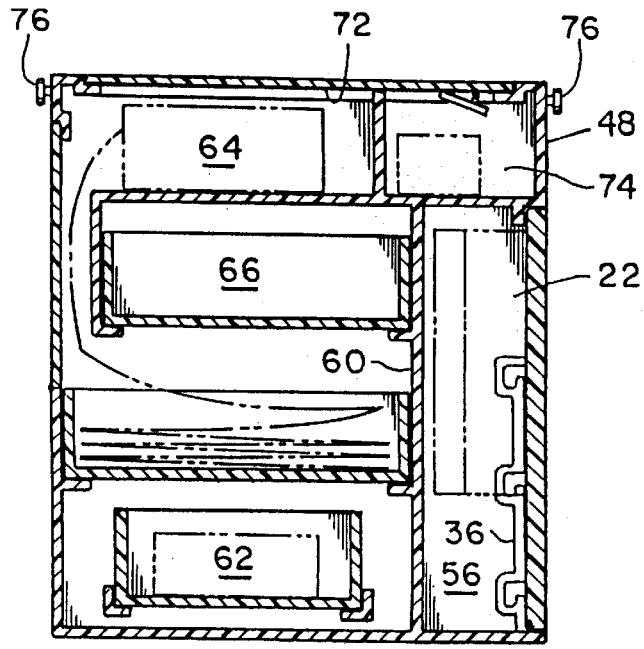
FIG. 7A is a cross sectional view taken along line 7—7 of FIG. 2 illustrating the FIG. 1 construction during a passive or non-use mode of the lap-top computer.

In the passive or non-use mode of the lap-top computer 22, and as best understood from FIG. 7A, the lap-top computer appropriately attached, by adhesive or mechanical means, to a surface 28 of a panel 30 is stored vertically within a storage compartment 56 of the structure 10 resulting from the opposite laterally extending lugs 32 (see FIG. 10) at the rear corners of the panel 30 being seated in the bottom-most portion of cooperating tracks 36 at position 32B (see FIG. 8). On opposite sides of a front opening 38 of structure 10, each track consists of a slot 40 bounded by edges 42. It is to be understood that the location 32B of lugs 32 is designed to enable panel 30, in a vertical orientation, to serve as a closure for the front opening 38.

In the FIG. 7A depiction of the structure 10, it is merely supported on the passenger seat 12 (not shown in FIG. 7A) and optionally may be held in place with the passenger security belt (also not shown) and, preferably the armrest 16 if not needed for comfort, is in its known raised or vertically oriented position.

To prepare for use of the lap-top computer 22, the armrest 16 is lowered, by a pivotal traverse, and the panel 30 to which the lap-top computer 22 is attached, is moved from its position as a closure of the opening 38 into a horizontal orientation, at a selected height as provided by opposite edge lugs 32 of panel 30 placed in either a top seat 44, the noted middle seat 34 or a bottom seat 46 of the cooperating side tracks 36, depending on the height 18 of the armrest 16 for the particular model of the auto in which it is used. As drawn in FIG. 7A, lugs 32 are located in seat 44 at position 32A as shown in FIG. 8.

For completeness sake, it is noted that structure or housing 10 has a front panel 48 in permanent facing relation to an occupant of the driver's seat 14, a back panel 50, and opposite left and right side panels 52, all appropriately connected at confronting edges to form a rigid rectangular structure bounding a large internal compartment, generally designated 54, which includes the previously noted lap-top computer storage compartment 56. Optionally either at the junction of the front edges of the side panels 52 with the side edges of the front panel 48, or behind a peripheral border area 58 resulting from a slight undersizing of the width of the opening 38 in relation to the width of the front panel 48, are the cooperating tracks 36 which, being vertically oriented, provide a vertical degree of movement to the panel 30 with its attached lap-top computer 22, to the various heights of the armrest.

Figure 7B:
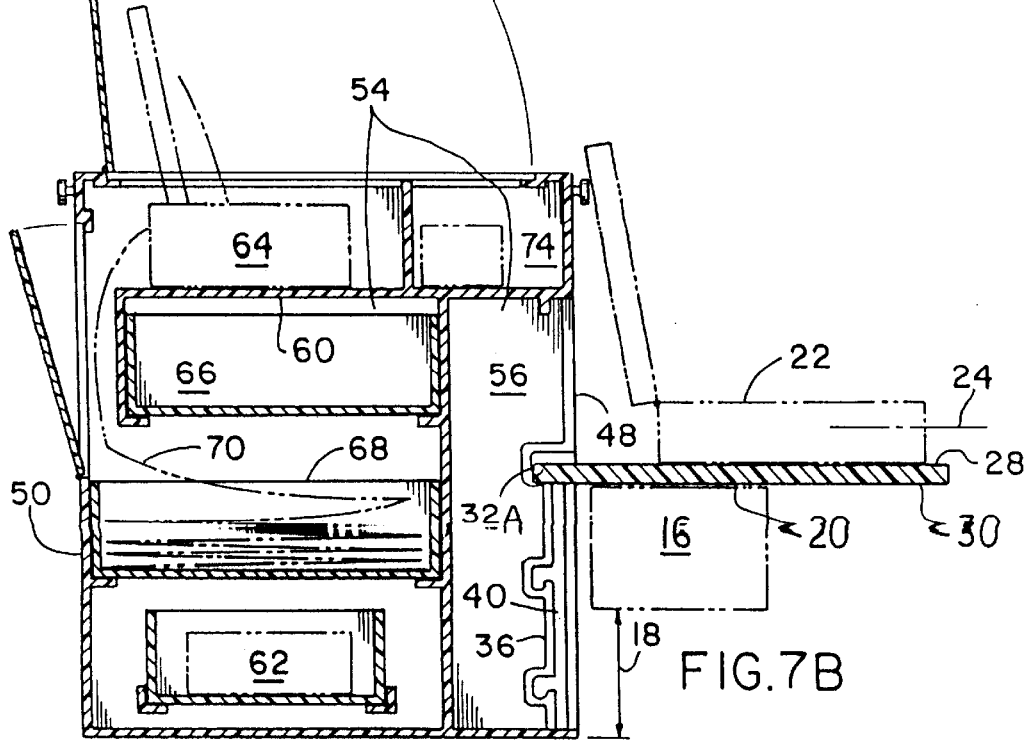
FIG. 7B is a similar view taken similarly along line 7—7 of FIG. 1, but illustrating the construction during an active or in-use mode of the lap-top computer.

As best shown in the cross sectional view in FIG. 7B, and supplemented by the perspective views of FIGS. 2–6, compartment dividing walls, individually and collectively designated 60, within the housing 10 provide a sliding drawer 62 recommended for storage of CD-Rom components used in the operation of the lap-top computer 22, a printer 64, an all-purpose utility drawer 66, a paper storage drawer 68 from which paper 70 can be fed to the printer 64, a pivotally mounted clip board 72, a cellular telephone storage area 74, and even external strap lugs 76 and 78 to facilitate carrying the housing 10 from its passenger seat location to another location.

From the foregoing, it should be readily understood that there has been described what can aptly be characterized as a mobile office for conducting computer business and related business chores, thus having significant utility for users of computers, such as insurance adjusters who make reports on the site of an accident.

While the auto lap-top computer-supporting construction herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In combination, a lap top computer-supporting construction, an auto front driver's seat, a front passenger's seat, and an armrest pivotal from a vertical orientation into a horizontal orientation, said lap top computer-supporting construction comprising a housing disposed on the front passenger's seat having a front panel in facing relation to a driver, a back panel, and opposite left and right side panels connected to extend between said front and back panels presenting vertically oriented confronting edges of said front panel and said opposite left and right side panels in connected relation with each other, parallel spaced apart edges bounding therebetween a tracking slot located adjacent said confronting edges of said front panel and said opposite left and right side panels, a lap top computer-supporting panel having rearwardly located laterally extending lugs each having an operative position disposed in a cooperating tracking slot, and said armrest of a specific height located adjacent said driver's seat, whereby a rear of said lap top computer-supporting panel has a degree of ascending movement along said tracking slots to the extent of said specific height of said armrest to contribute to a horizontally oriented position of a lap top computer positioned on said lap top computer-supporting panel.

* * * * *